United States Patent Office 3,751,505
Patented Aug. 7, 1973

3,751,505
HYDRODEALKYLATION PROCESS
Angelo Bergomi, Akron, Ohio, assignor to The Goodyear Tire & Rubber Company, Akron, Ohio
No Drawing. Filed Mar. 28, 1972, Ser. No. 238,946
Int. Cl. C07c 3/58
U.S. Cl. 260—672 R  9 Claims

ABSTRACT OF THE DISCLOSURE

There is disclosed a method for the hydrodealkylation of hydrocarbons in which toluene, xylene, ethyl benzene and mono- and dimethylnaphthylenes are hydrodealkylated when passed with hydrogen over a catalyst comprising an alkali metal dispersed on an anhydrous support, said catalyst having a surface area of at least one square meter per gram at temperatures ranging from about 220° C. to about 550° C.

---

This invention relates to the new use of a catalyst for the hydrodealkylation of hydrocarbons. Specifically, it relates to the hydrodealkylation of alkyl-aromatic compounds. It also relates to a novel process of hydrodealkylation utilizing the catalyst.

A number of processes relating to the hydrodealkylation of alkyl-aromatic compounds have been commercialized although very little is known about the nature of the catalysts employed. Some of these processes are thermal; others are catalytic in character. Some of the catalysts which have been employed are nickel-alumina, cobalt-molybdenum-alumina, and chromia-alumina. The general range of conditions employed using these processes is 500–750° C. temperature and 300–1000 pounds square inch gauge pressure.

The object of this invention is to provide a novel hydroalkylation process. It is also an object of this invention to provide a hydrodealkylation method that can be carried out under milder conditions of temperature and pressure than heretofore employed. It is also an object of this invention to provide a hydrodealkylation process wherein the catalyst can be supported on a wide variety of anhydrous solids.

According to the invention alkyl-aromatics-hydrocarbons may be hydrodealkylated when passed with hydrogen over a catalyst comprising an alkali metal dispersed on an anhydrous support, said catalyst having a surface area of at least one square meter per gram.

The alkyl-aromatic hydrocarbons should be anhydrous and contain little or no peroxides, amines, or sulfur compounds since the presence of water, peroxides, amines or sulfur tend to deactivate the catalyst.

The hydrocarbons to be hydrodealkylated include toluene, xylenes, ethyl benzene and mono- and dimethylnaphthalenes.

The catalysts employed in the hydrodealkylation are pure alkali metals dispersed on a variety of hydrous supports. By the term "catalyst" is meant the total of the alkali metal plus the support. The alkali metals can be potassium sodium, lithium, cesium, rubidium or any mixture thereof. The catalyst may contain from about 5 percent to about 50 percent by weight of the alkali metal. The preferred range is from about 10 percent to about 30 percent.

The component of the catalyst which is the support is an anhydrous support. Representative of some of the useful supports are alumina, charcoal, magnesia, molecular sieves, silica-alumina and potassium carbonate. Other representative examples of supports which may be used in this invention are the hydroxides of Group I–A metals of the Periodic Chart of the elements, hydroxides of Group II–A metals of the Periodic Chart of the elements, silicates of the Group I–A metals of the periodic Chart of the elements, silicates of the Group II–A metals of the Periodic Chart of the elements, carbonates of Group I–A metals of the Periodic Chart of the elements, carbonates of the Group II–A metals of the Periodic Chart of the elements, as well as oxides of Group IV–B, VI–B, II–B metals of the Periodic Chart of the elements. Thus, it could be said that almost any known support can be employed.

Additives in the amount from about 0.1 percent to about 10 percent which may be added to the catalyst to increase the selectivity to the desired product are oxides, carbonates, or silicates of Group I–A metals or Group II–A metals of the Periodic Chart of the elements. Also, oxides of Group IV–B, Group V–B, Group VI–B, Group VII–B, Group VIII–B, Group I–B, Group II–B or Group III–B metals.

The hydrodealkylation reaction used in this invention may be carried out batchwise, or continuously over a fixed or fluid bed catalyst. The rate at which the hydrocarbons are passed over the catalyst bed in a continuous hydrodealkylation process is usually measured in terms of liquid hourly space velocity (LHSV). The term "LHSV" is defined as the volume of hydrocarbon feedstock as a liquid per volume of total catalyst passed over or contacting the catalyst per hour. The hydrocarbon can be fed at LHSV of 0.01 to 10.0; however, the preferred range is 0.05 to 5.0.

In the employment of this invention, hydrogen is passed simultaneously with the hydrocarbon over the catalyst bed. The molar ratio of the hydrogen to the hydrocarbon can range from about 0.5/1 to about 10/1. The preferred molar ratio of the hydrogen to the hydrocarbon can range from about 1/1 to about 5/1.

In the preferred embodiment of this invention a vapour phase hydrodealkylation with a fixed bed catalyst is employed. Thus the amount of alkali metal employed in the catalyst is related to the rate at which the hydrocarbon to be hydrodealkylated is passed over or through this fixed bed catalyst. This is not to say, however, that liquid phase hydrodealkylation cannot be employed.

The temperature range employed in this invention is from about 220° C. to about 550° C. The preferred temperature range is from about 250° C. to about 400° C.

The pressure employed in this invention appears to have an effect on the conversion of the alkyl aromatic compound to the parent compound. The pressure may vary between atmospheric pressure and 2500 pounds square inch gauge. At pressures higher than atmospheric, the percent of hydrodealkylation reaction increases.

Since the surface area of the catalyst is where the hydrodealkylation reaction takes place, it is important to have a sufficient surface area in order to make the catalyst efficient. It is believed that there is an interaction of the metal with the anhydrous support, but not to the extent that the metal is deactivated with respect to the catalytic activity of hydrodealkylation.

To be effective in this invention, the catalyst should have a surface area of about 1 square meter to about 1000 square meters per gram of catalyst. A more preferable surface area would be from about 50 square meters to about 1000 square meters per gram of catalyst. The most preferred surface area would be from about 200 square meters to about 1000 square meters.

The prefered use of this invention would seem to be using pressure since the catalyst seems to have a better life and the hydrodealkylation reaction is more efficient.

Further practice of this invention is illustrated by reference to the following examples which are intended to be illustrative and in no manner limiting.

EXAMPLE I

The support, charcoal, was heated at 400° C. for one hour under reduced pressure (1 millimeter mercury) then cooled to 250° C. while nitrogen was admitted. Potassium, 30 percent by weight of the support, was added at 250° C. under a nitrogen atmosphere. The mixture was stirred occasionally over a one-hour period, then cooled to room temperature. The catalyst was transferred under a nitrogen atmosphere to the reactor. The reactor was closed and hydrogen introduced to a pressure of 200 pounds per square inch. Then the reactor was heated to 200° C. for about four hours to activate the catalyst.

Dried toluene was hydrodealkylated employing 10.5 milliliters of the above catalyst which had a surface area of at least one square meter per gram by simultaneously passing hydrogen and the toluene at 250° C. over the catalyst. A LHSV of about 0.3 was maintained with a hydrogen to hydrocarbon ratio of about 2. The hydrocarbon product was collected in a cooled receiver and analyzed by gas chromatography. The percentages of the product are calculated in terms of weight percent.

Table 1 lists the toluene hydrodealkylation along with other catalyst and conditions employed using the same procedure.

TABLE 1.—HYDRODEALKYLATION OF TOLUENE AT ATMOSPHERIC PRESSURE

| Catalyst | Temperature, °C. | LHSV toluene | Ratio H$_2$ toluene | Weight percent benzene |
|---|---|---|---|---|
| 30% K/charcoal | 250 | 0.3 | 2 | 2.7 |
| 30% Na/charcoal | 300 | 0.3 | 2 | 1.2 |
| 10% K/Al$_2$O$_3$ | 250 | 0.3 | 2 | 3.0 |
| 10% K/Al$_2$O$_3$ | 300 | 0.3 | 2 | 6.9 |
| 10% Na/Al$_2$O$_3$ | 300 | 0.3 | 2 | 3.8 |
| 10% Na/Al$_2$O$_3$ | 350 | 0.3 | 2 | 15.3 |
| 30% K/MgO | 300 | 0.3 | 2 | 3.3 |
| 30% K/MgO | 350 | 0.3 | 2 | 25.0 |
| 30% K/3A mol sieves | 350 | 0.3 | 2 | 3.7 |
| 30% K/5A mol sieves | 350 | 0.3 | 2 | 3.3 |
| 30% K/10X mol sieves | 350 | 0.3 | 2 | 1.4 |
| 30% K/13X mol sieves | 300 | 0.3 | 2 | 2.5 |

EXAMPLE II

The same procedure was used as in Example I except that the hydrodealkylation reaction was conducted under hydrogen pressure. Results are reported in Table 2:

TABLE 2.—HYDRODEALKYLATION OF TOLUENE UNDER PRESSURE

| Catalyst | Temperature, °C. | Pressure, p.s.i.g. | LHSV toluene | Ratio H$_2$ toluene | Weight percent benzene |
|---|---|---|---|---|---|
| 30% K/MgO | 300 | 500 | 1.0 | 2.8 | 5.8 |
| 30% K/MgO | 300 | 1,000 | 1.0 | 2.8 | 11.8 |
| 30% K/MgO | 350 | 1,000 | 1.0 | 2.8 | 41.4 |
| 30% K/Al$_2$O$_3$ | 300 | 1,000 | 0.5 | 1.0 | 17.9 |
| 30% K/Al$_2$O$_3$ | 350 | 1,000 | 0.5 | 1.0 | 20.1 |
| 20% Na/Al$_2$O$_3$ | 350 | 1,000 | 0.5 | 1.0 | 18.4 |
| 30% Na/charcoal | 300 | 1,000 | 0.5 | 1.0 | 11.3 |

While certain representative embodiments and details have been shown for the purpose of illustrating the invention, it will be apparent to those skilled in this art that various changes and modifications may be made therein without departing from the spirit or scope of the invention.

What is claimed is:

1. A process for hydrodealkylation of hydrocarbons in which toluene, xylenes, ethylbenzene and mono- and dimethyl naphthalenes are hydrodealkylated when passed with hydrogen over a catalyst consisting of an alkali metal dispersed on an anhydrous support, said catalyst having a surface area of at least one square meter per gram, at temperatures ranging from about 220° C. to about 550° C.

2. A process according to claim 1 in which the alkali metal is at least one member selected from the group consisting of potassium, sodium, lithium, cesium and rubidium.

3. A process according to claim 1, the surface area of the anhydrous support ranges from about one square meter to about 1000 square meters per gram.

4. A process according to claim 1 in which the amount of alkali metal varies from about 5 percent to about 50 percent by weight of the entire catalyst.

5. A process according to claim 1 in which the LHSV for the hydrocarbon ranges between about 0.01 and about 10.0.

6. A process according to claim 3 in which the surface area of the anhydrous support ranges from about 200 square meters to about 1000 square meters per gram.

7. A process according to claim 1 in which the hydrocarbon is toluene.

8. A process according to claim 1 in which the hydrodealkylation reaction is conducted under pressure from 1000 to 1500 pounds per square inch gauge.

9. A process according to claim 1 in which the molar ratio of the hydrogen to the hydrocarbon is from about 0.5/1 to about 10/1.

References Cited

UNITED STATES PATENTS 3,268,610   8/1966   Bloch _____ 260—672 R

CURTIS R. DAVIS, Primary Examiner